J. N. DUNCAN.
AUTOMOBILE SHIPPING DEVICE.
APPLICATION FILED OCT. 20, 1917.

1,290,818. Patented Jan. 7, 1919.

WITNESSES:

INVENTOR
James N. Duncan
BY
Newell Neal
ATTORNEYS

UNITED STATES PATENT OFFICE.

JAMES N. DUNCAN, OF DETROIT, MICHIGAN, ASSIGNOR TO DODGE BROTHERS, OF DETROIT, MICHIGAN, A CORPORATION OF MICHIGAN.

AUTOMOBILE-SHIPPING DEVICE.

1,290,818.   Specification of Letters Patent.   Patented Jan. 7, 1919.

Application filed October 20, 1917.   Serial No. 197,538.

*To all whom it may concern:*

Be it known that I, JAMES N. DUNCAN, a citizen of the United States, residing at Detroit, Michigan, have invented certain new and useful Improvements in Automobile-Shipping Devices, of which the following is a clear, full, and exact description.

This invention relates to an improvement in means for supporting automobiles in freight cars during shipment and has for its chief object the provision of a device which will support the automobiles in such a way that a maximum number of them may be placed in a freight car without completely disassembling the machines or spending a great amount of time and labor in stowing them.

Owing to the fact that the freight charged by the railroad companies is based upon a certain minimum weight per car, which, in the case of shipment of automobiles, is very frequently in excess of the actual weight transported, the method of loading herein described is of great importance commercially. The shortage of freight cars which frequently exists is another condition which urges its use.

Another object of the invention is to provide a means for supporting automobiles during shipment in such a way that they may be readily introduced into a freight car having a narrow doorway so that ordinary box cars which are not of the special "automobile" type may be utilized.

Still another object is to provide a means for supporting automobiles in freight cars which is inexpensive and easy to construct and which requires a small amount of material.

These being among the objects of the present invention, the same consists of certain features of construction and combinations of parts to be hereinafter described and then claimed with reference to the accompanying drawings which illustrate a suitable embodiment of the invention having the above and other objects in view.

Figure 1:
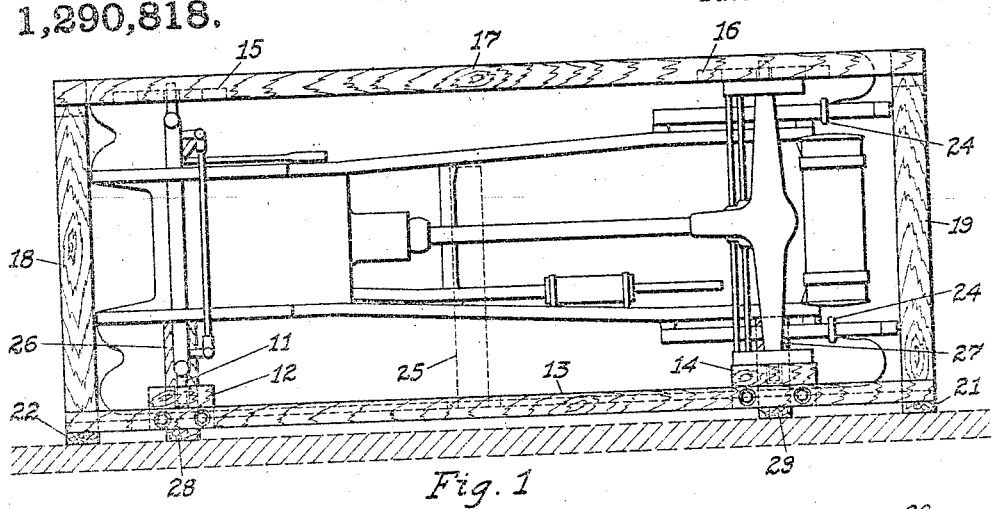
Figure 1 is an elevation showing the device with an automobile in place ready for shipment.
Figure 2:
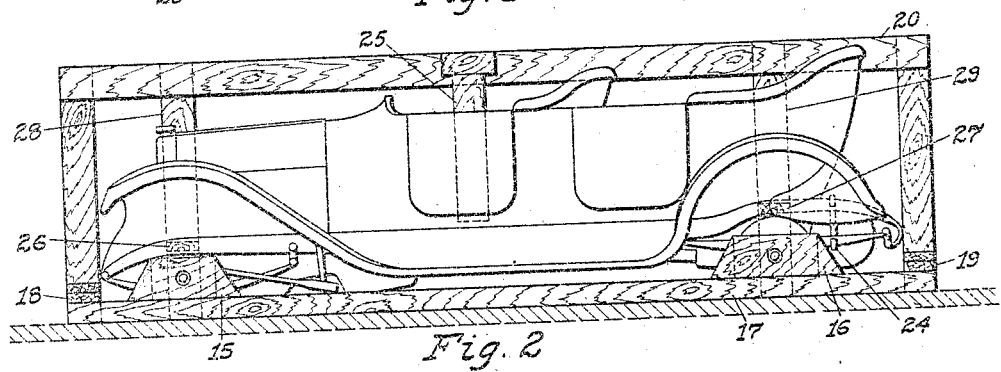
Fig. 2 is a top plan view of the same.
Figure 3:
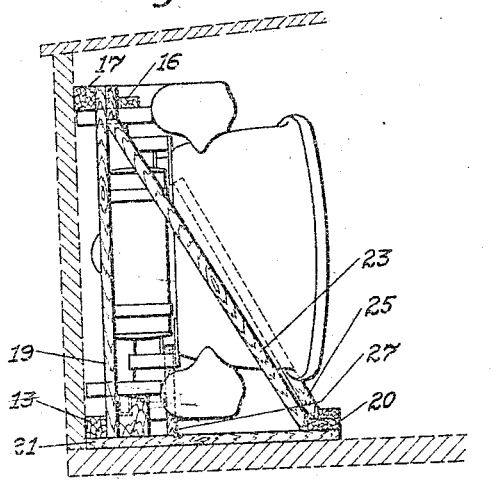
Fig. 3 is an end elevation showing the device in place in a freight car, the outline of the freight car being indicated by dotted lines.

As shown in the drawings, an automobile carried by the device of this invention may be practically complete, the only parts of importance which have to be removed being the wheels, top and windshield. It will further be observed that the automobile is supported principally by its axles and is carried upon its side, this position being the one which requires the least amount of floor space and consequently permits the maximum number of automobiles to be stowed in a freight car of a given size and also permits the automobiles to be passed through a doorway of minimum width.

The frame work for supporting the automobile consists of a main panel lying in a vertical plane and to which the automobile is securely attached, together with the frame-work, forming a second panel in a horizontal plane, which serves as the base of the construction and rests upon the floor of the freight car. Suitable inclined bracing between the two panels gives the structure the required stiffness.

The drawings show one method of constructing a suitable framework, but it is not desired to confine the invention to the exact arrangement shown as it will be apparent that numerous modifications can be made without affecting the principle of the device or its utility.

The front axle spindle 11 on the lower side is supported in a suitably shaped hole in block 12 which is securely fastened to the lower longitudinal member 13. In a similar way the end of the rear axle housing on the lower side is held by the block 14 which is also fastened to the member 13. Similarly at the other ends of each of the axles the blocks 15 and 16 at the front and rear respectively form connections to the upper longitudinal member 17. The longitudinals 13 and 17 are connected at their extremities by vertical members 18 and 19 to which they are securely connected to form a rigid rectangular frame. The third longitudinal 20, lying parallel to the other two, forms with the transverse members 21 and 22 a rectangular horizontal frame similar to that in the vertical plane. This horizontal frame forms a base for supporting the entire framework and allows the complete frame with an automobile in place to be moved about readily by the use of trucks or dollies. To connect the horizontal and vertical frames, inclined braces, such as 23, may be used, thus forming a rigid, self-sustaining framework.

In applying the framework to an automobile, it is convenient to place the automobile in its normal position, but with its wheels removed, upon the frame formed by the members 13, 17, 18 and 19 and then to apply the blocks 12, 14, 15 and 16 or other means for securing the axles and finally to turn the complete structure over on its side as shown in the drawings.

As the connection of the automobile to the frame is through its axles, it is apparent that the greater part of the weight is supported by the springs and consequently the frame and body of the car would be capable of considerable movement relative to the framework which might cause serious damage in transit. To prevent this, it is convenient to retain the springs in a nearly closed position by heavy steel clamps as indicated by the numeral 24. It may also be advisable to provide inclined braces as 25 extending from the base of the framework to the frame of the automobile or to some part which is rigidly attached to the frame. Vertical struts such as 26 and 27 may also be provided if thought necessary to relieve the springs. These struts may extend between the frame of the automobile and the base of the supporting framework.

After the framework and automobile are properly located in the freight car, it is advisable to secure them against any shifting which might occur due to rough handling of the freight car. This may very easily be done by nailing the lower panel of the framework to the floor of the freight car and, if desired, the upper longitudinal member 17 may also be securely fastened to the side of the car, thus relieving the inclined bracing from practically all strain.

What I claim as new is—

1. An automobile shipping frame, comprising a panel adapted to protect and support the under-frame of the vehicle, a single side protecting and supporting panel and braces maintaining said panels substantially perpendicular to each other.

2. An automobile shipping frame, comprising two panels each adapted to serve as a base, braces rigidly maintaining said panels substantially in perpendicular relation to each other, and means for holding the automobile to be shipped within the protecting edges of said panels.

3. A framework for supporting an automobile during transportation consisting of a single panel in a vertical plane and a single panel in a horizontal plane, inclined braces for connecting said panels and connecting members shaped to retain the axles of an automobile and attached to one of said panels.

4. An automobile shipping frame, comprising a panel to protect and support the under-frame of the vehicle, a single side protecting and supporting panel, braces maintaining said panels substantially perpendicular to each other, and means carried by the under-frame supporting panel for directly connecting the vehicle axles to said panel.

5. An automobile shipping frame, comprising a panel to protect and support the under-frame of the vehicle, a single side protecting and supporting panel, braces maintaining said panels substantially perpendicular to each other, and means connecting the under-frame and body to said panels to permit the support of said shipping frame upon the side panel as a base.

6. An automobile shipping frame, comprising panels supporting and protecting the under-frame and one side only of the vehicle, braces maintaining said panels in rigid supporting relation to each other, and other braces for supporting said vehicle on said frame when said frame is turned upon its side.

Signed at Detroit, Mich., this 18th day of October, 1917.

JAMES N. DUNCAN.

Witnesses:
  REGINALD J. FRY,
  ALFRED H. KNIGHT.